Feb. 28, 1961   R. C. BENNETT   2,973,020
APPARATUS FOR SAWING WIDE BOARDS
Filed May 2, 1958   2 Sheets-Sheet 1
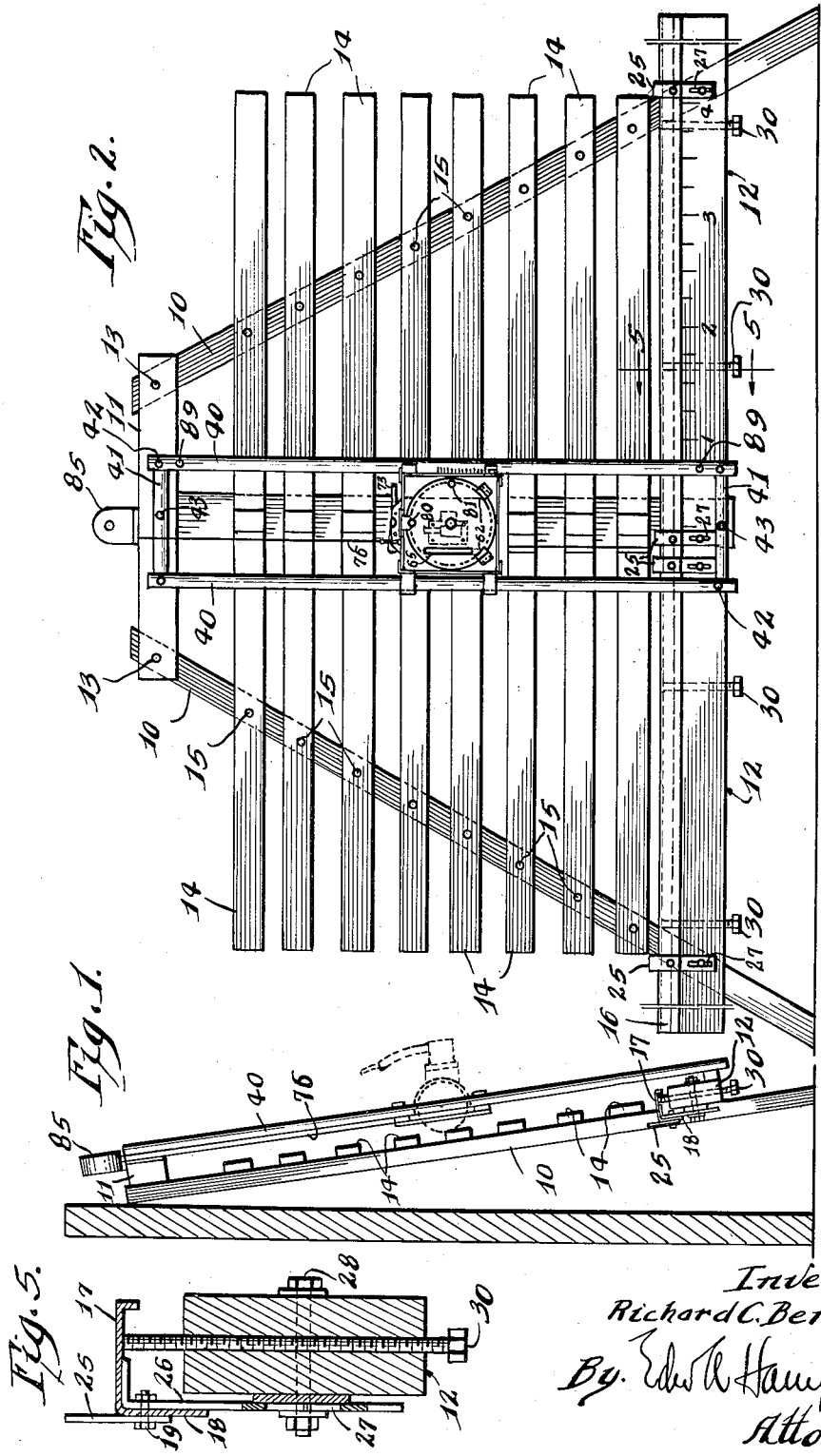
Inventor:
Richard C. Bennett
By. Edw. A. Hampton
Attorney.

Feb. 28, 1961  R. C. BENNETT  2,973,020
APPARATUS FOR SAWING WIDE BOARDS
Filed May 2, 1958  2 Sheets-Sheet 2
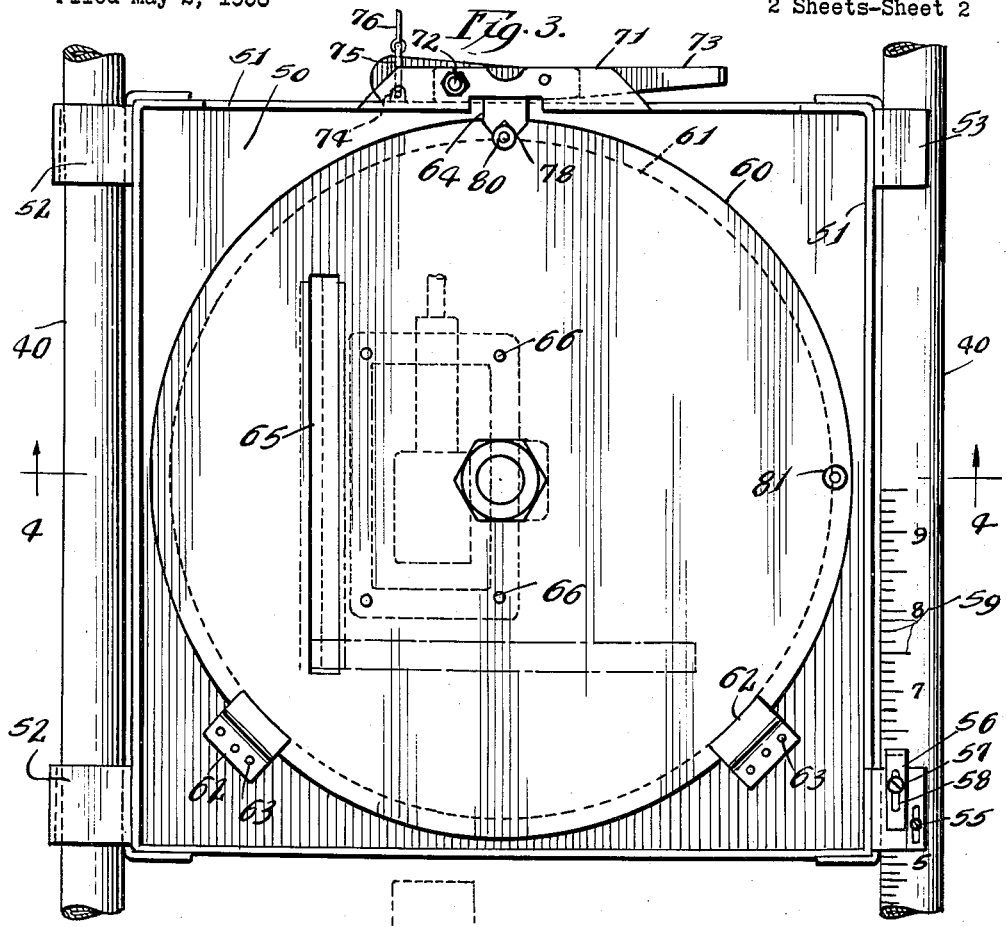
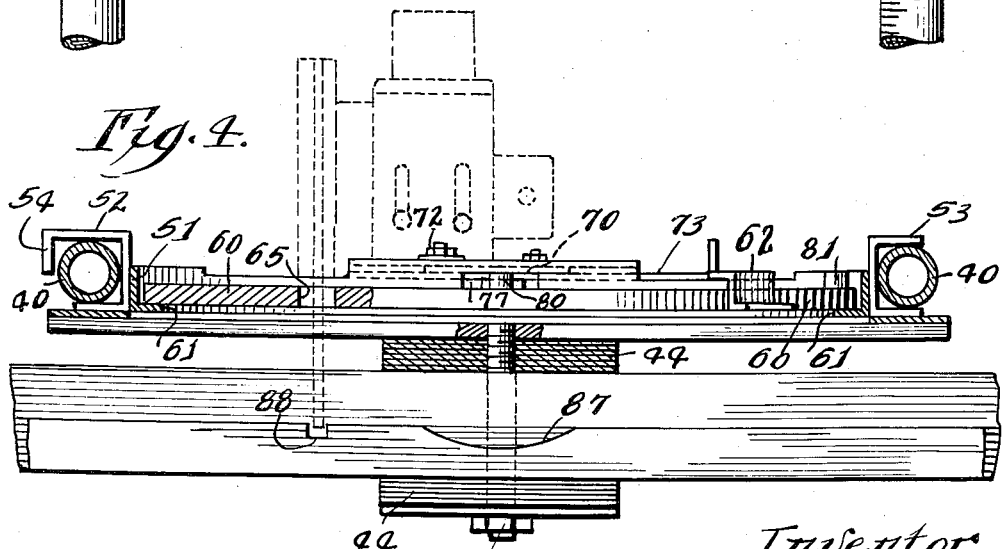
Inventor:
Richard C. Bennett.
By Edw'd Hampson
Attorney.

United States Patent Office 2,973,020
Patented Feb. 28, 1961

2,973,020

APPARATUS FOR SAWING WIDE BOARDS

Richard C. Bennett, Laceyville, Pa.

Filed May 2, 1958, Ser. No. 732,556

6 Claims. (Cl. 143—47)

This invention relates to a novel and improved apparatus for use in particular for sawing wide boards such as those generally referred to as fiber insulation boards, plywood, various types of hardboard, the so-called particle boards, and the like, which are usually four feet in width and of varying length, the most common probably being those eight feet in length, although generally these types of boards are available in longer lengths, such as in lengths of ten and twelve feet, and in some cases of still longer length.

These large sheets of material are very unwieldy and while, of course, they can be sawed with an ordinary hand saw, or an electric hand saw, or the ordinary shop bench saw, their size makes sawing difficult in connection with the handling of the boards. To saw such boards in the present conventional manner generally involves the provision of a big table or special supporting saw horses or trestles, or the necessity of impressing a man into service to hold the overhanging portion of the board or the like, and then the sawing is difficult since the reach across the board is four feet. Additionally, such sawing can be only along a marked line guided by the eye, so that accurate sawing of such wide boards is always somewhat of a problem.

In contrast with the sawing of these wide boards in accordance with ordinary and conventional procedures, the apparatus hereof provides an ample support for the wide board being sawed. It is so designed that it takes up relatively little floor space, and it provides for accurately guiding the saw whether such is across the width or is lengthwise of the board.

This apparatus comprises a board support or bed which is of easel-like construction and which can be conveniently supported against a wall or against a stud or substantially any vertically supporting surface or member. In the absence of an available vertical supporting wall or other member, the device can be supplied with equivalent connected legs so that it can be used without extraneous support devices.

The bed or board supporting portion of the apparatus is large enough to support the conventional wide board which, as referred to, is normally four feet wide, and it is, of course, made of sufficient length that it will suitably support boards of the lengths in which such are available.

The board is supported on the bed or board support on a horizontal ledge which is positioned at right angles to the bed proper so that, as it will be understood, with the bed of the apparatus positioned substantially vertically, the board will be supported against or on such bed while resting along its bottom edge on the ledge provided therefor, and accordingly the floor space occupied is relatively small, say, actually only about one foot of width by some ten or twelve feet in length.

There is a cross slide mounted over the bed of the device, suitably spaced therefrom and supported thereby on which there is provided a carriage member and in which there is provided a turntable-like member to which there is suitably mounted an electric hand power saw. The cross slide extends across the width of the bed of the apparatus, and with the turntable in one position the traverse of the carriage along the cross slide will cut a big board supported on the bed across its width. By suitably positioning the carriage on the cross slide and turning the saw at right angles to its cross cutting position, the device is arranged for ripping a big board lengthwise, which is accomplished by merely pushing the board through the apparatus, its lower edge, of course, being supported on the ledge provided therefor.

While above the general arrangement of the apparatus has been briefly described, its specific construction and operation will be hereinafter more fully described in connection with the drawings which accompany this specification.

The invention hereof constitutes an improvement of the apparatus disclosed and claimed in my prior application for patent, Serial No. 286,278 filed May 6, 1952.

The principal object of the invention hereof is the provision of an apparatus for the accurate sawing of big boards, such as the various fiber insulation board, plywood boards, hardboard and the like, as such are now manufactured and sold. A further object of the invention hereof is to provide such an apparatus which is simple but practical, is of rugged construction, and is simple to operate, and in particular such an apparatus which may conveniently be used by one man without the need of assistance. A further object hereof is that of providing an apparatus of the type described in detail which will provide for very accurate sawing of such big boards and wherein, in sawing, it is unnecessary that guide lines be provided and followed in connection with the sawing operation. Still other and additional objects of the invention will be apparent on reading the following description of the apparatus in conjunction with the accompanying drawings illustrated by the apparatus.

The inventions hereof are illustrated in the accompanying drawings in which

Figure 1 is an end elevation;

Figure 2 is a face elevation;

Figure 3 is a top plan view of the carriage and turntable assembly;

Figure 4 is a section taken on line 4—4 of Figure 3; and

Figure 5 is a section detailing the construction of the ledge for supporting a board on the apparatus.

The saw apparatus hereof comprises a bed portion which is comprised of divergent leg members 10 which are secured at their upper ends to top frame member 11 and adjacent their lower ends to a bottom frame member 12, the members 10 being suitably secured to the frame members 11 and 12 by bolts or equivalent securing means 13. Boards 14 are suitably mounted to the leg members 10 intermediate the top and bottom frame members 11 and 12. These board members 14 are spaced and secured to the leg members 10 by suitable securing means 15 which may be nails or, preferably, other equivalent securing means such as screws, bolts, or the like.

Conveniently, but not necessarily, the top frame member 11 may be a two-by-four, the bottom frame member 12 a two-by-six, the leg members 10 may comprise two-by-fours, and the bed portion 14 one-by-fours. These frames, as just described, are wood members but it will be understood, of course, that such may be suitably formed of sheet metal or may comprise equivalent light weight metal elements of aluminum or magnesium or alloys thereof suitably formed from sheet metal, or as rolled shapes.

The apparatus being particularly for sawing big boards, as referred to, it is preferably of general dimensions as to length of about, for the lower frame member 12, 14 feet, and for boards 14 comprising the bed, about 12 feet. The length of the upper frame member 11 may be about four feet. It is to be understood that the figures just given are only what might be termed average, and that these dimensions will be varied, particularly in accordance with the size of boards which it is expected will be sawed. If it is expected that a considerable number of four-by-twelve boards will be ripped, it will probably be desirable that bottom frame member 12 be, say, about twenty feet long, and that boards 14 comprising the bed about sixteen feet long.

It is, of course, apparent that shrinkage or expansion or twisting or warping of frame member 12 can adversely affect its function as an accurate rest or guide to the edge of a board placed thereon. Accordingly, a rigid rest or ledge 16 is mounted thereto to insure accuracy. Such ledge member is mounted to frame member 12 in such manner as to be adjustable relative thereto, and adjusting screws are provided so that accurate adjustment may be made.

The rigid rest member 16 and its mounting is illustrated in detail in Figure 5 of the drawing. Here it will be seen that the rest member proper comprises a channel-shaped portion 17 which is the actual rest member, which is shown as having one leg appreciably longer than the other for the purpose which will be evident. This channel-form member is preferably a continuous element which extends from end to end of the apparatus so that at all times the board being sawed will be positioned accurately during the sawing procedure.

The longer leg 18 of the channel-form member 17 is, at a number of points, indicated in Figure 2 as at four positions provided with perforations to receive bolts 19 which secure to one side thereof a flat strip, preferably a flat steel strip 25, and to the other side thereof an angle member 26, the downwardly projecting leg of which is provided with an elongated slot 27. This assembly just described is mounted to the bottom frame member 12 by bolts 28 extending through member 12, and it will be evident that when this guide assembly is so mounted that it will provide, with respect to bottom frame member 12, an adjustable board rest and guide member for a board being sawed.

In order that the guide and rest assembly may be maintained as a plane surface and accurately at right angles to the saw carriage guides, which determine the path of the saw, there are provided adjusting screws 30 which extend through the height of bottom frame member 12 and project above the upper surface thereof. It will be evident that if the mounting legs 26 of the board rest assembly 16 are mounted adjacent the ends of the members making up the lower frame member 12, with the consequence that they are at or adjacent points where frame member 12 is fixed, it is obvious that warping and the like of lower frame member 12 will have substantially no effect on the position of guide rest 16. Additionally, it is obvious that with a number of adjusting screws provided, indicated as four, positioned with substantially equal spacing, that by suitable adjustment of the adjusting screws 30 the member 16 can be accurately aligned at right angles to the path of the saw, and that any deviation which may occur for one reason or another may be readily compensated for by suitable adjustment of screws 30.

For mounting the saw carriage there is provided a saw carriage frame and guide which is comprised principally of side guide members 40 and connecting members 41. Connecting members 41 are suitably connected to the side guide members 40, and by bolts or the like 42. It will be obvious that when this saw carriage guide assembly is suitably mounted over the bed or frame of the apparatus it will provide a guide or slide on which may be mounted a saw carriage assembly which will traverse the height of the apparatus. The members 41 of the carriage guide or slide assembly are provided centrally with suitable perforations through which pass bolts 43 which also pass through suitable holes provided in top and bottom frame members 11 and 12, respectively. It will be evident that when the saw carriage guide assembly is bolted to frame members 11 and 12, as described, it is rigidly mounted over the bed of the apparatus, as previously described.

For the purpose of adjustment of the saw carriage guide assembly to compensate for a decrease in the diameter of the saw as it is sharpened, or for the purpose of raising the assembly further from the face of the bed in connection with sawing thicker material, there are provided suitable shim members 44, some of which are mounted under the head of the bolt with the rest of them mounted between the frame members 11 and 12 and the upper and lower members 41 of the saw carriage guide assembly. It is evident that by suitably moving these shims from the one position to the other that the distance between the saw carriage guides 40 and the face of the bed of the apparatus may be increased or decreased, as desired.

An electric hand saw is mounted to the carriage which in turn is mounted to the saw carriage guide assembly just above described. This saw carriage comprises a shallow pan-like member 50 to the side walls 51 of which there are attached suitable brackets 52 and 53 for mounting the saw carriage to the saw carriage guide members or rails 40. It will be seen that brackets 52 and 53 are of substantially channel-form to embrace the guide rails 40 and that they serve to mount the pan member 50 of saw carriage to the guide rails. As shown, bracket 53 is of channel-form, dimensioned to fit the guide rail, whereas bracket 52 is of the same general form but one leg thereof is extended and turned downwardly at right angles, as at 54, to provide for accurate alignment of the saw carriage with respect to the rail 40 to which this bracket 52 is mounted. It will, of course, be understood that the construction of the saw carriage as so far described is not critical, that is, the generally pan-shaped member 50 may be stamped of one piece or it may be made up of angles and a base plate suitable welded, riveted, or the like. Again, brackets 52 and 53 may be formed in any desired manner and suitably attached to the pan member 50 by welding, riveting, or the like, and it is evident that the procedure of construction thereof is not of importance, and that it is only the form of the pan 50 and mounting brackets 52 and 53 which are of importance, and that such has been adequately described. In bracket 53 or in bracket 52, if desired, a suitably threaded hole is provided in which may be mounted a thumb screw 55, by means of which the saw carriage assembly may be clamped in a fixed position to a rail 40 of the saw carriage guide.

If desired, an indicator 56 may be provided, suitably secured to bracket 53 and secured thereto by screw 57 extending through a slot 58 therein. This indicator 56 serves to locate the carriage on its guides in accordance with dimensional indices which may be provided on a guide 40 as indicate at 59 in Figure 3.

For mounting an electric hand saw to the saw carriage, there is provided a turntable member 60. This turntable member is positioned on the bottom of pan member 50 over and concentric with a circular opening 61 provided therein and which is of slightly less diameter than that of the member 60, so that the member 60 is supported peripherally by the base portion of the pan member 50. The member 60 is retained against the bottom of the pan member 50 by what might be termed Z clips 62 which are suitably welded or riveted as at 63 to the bottom of pan member 50. These clip members 62 are not of exact Z form in that they constitute a vertical wall having top and bottom, oppositely directed, flanges positioned at right angles to the vertical portion thereof. It will be obvious that the edge of the circular member 60 may be slipped under the upper flange of these clip members 62 and be held thereby against the face of the bottom of pan member 50. To secure the circular member 60 in place there is a further securing member 64 which serves a dual purpose and which will be subsequently described in more detail. Member 60 is provided with a slot 65 positioned as shown to receive a saw blade of an electric hand saw which is merely indicated by dotted lines, since the specific construction or form of the electric hand saw will vary in accordance with the particular saw used. In any case, however, suitably positioned holes, such as 66, are provided in member 60 to receive bolts or screws for securing the electric hand saw to the member 60.

The above referred to securing member 64 is a part of what will be referred to as "latch unit" 70, the entire assembly of which will now be described.

Latch assembly 70 is mounted to a flange member 71 which is turned outwardly at right angles to an upstanding wall or rim member 51 of pan member or carriage 50. The latch assembly is connected or mounted to flange 71 by bolt 72 which passes through lever member 73 so that lever member 73 is pivoted intermediate its length on pivot bolt 72. Lever member 73 is provided with a notch 74 adjacent its short end to receive a link or the like 75 which connects to a tape 76, the function of which will be subsequently described, attached to lever member 73 and is what will be referred to as a detent member 77. This detent member 77 is formed with the projecting latch or securing member 64 with the detent member 77 secured to lever member 73 so that it pivots on pivot bolt 72 with the lever. Securing member 64, at its bottom edge, is provided with a V-notch 78 for cooperation with a post 80 mounted on turntable 60.

The operation of the latch assembly 70 is as follows: Tape 76 is maintained under tension so that at all times the lever member 73 and connected detent member 77 are urged in a clockwise direction. This maintains the assembly in what might be termed a "closed" position with securing member 64 projecting downwardly to engage a post member 80 to lock turntable 60 in position. It will be evident that an upward pull or force applied to lever 73 will pivot the lever 73 and detent 77 counter-clockwise against the tension of tape 76 with the consequent withdrawal of securing member 64 so as to free it from its latching relationship with post 80, and whereupon two things may occur. Either turntable 60 may be rotated to a different position to bring post 81 into position to be secured by securing member 64, or, if desired, securing member 64 withdrawing past the edge of turntable 60, the turntable may be released so that it may be tilted outwardly and then withdrawn from engagement with Z clips 62 and removed from the pan-like carriage member 50.

The two posts 80 and 81 on turntable 60 are located, the one on a diameter of turntable 60, which is parallel to the saw blade of the electric hand saw mounted thereon, and the other, post 81, is positioned at 90° therefrom so that alternatively the saw blade may be positioned vertically with respect to ledge or rest 16 or, adjusted to the alternative position, may be parallel to such ledge member 16. In the one position, that is, with the saw blade perpendicular to ledge 16, it is obvious that a cross cut may be made, whereas, in the other position of the saw blade, as referred to, it is obvious that by pushing a board along ledge 16 the board may be ripped lengthwise.

There is provided, suitably mounted to the top frame member 11, a spring balance-type tensioning means 85. Such devices are readily available on the market and comprise a suitable case in which is mounted a tape which is spring-tensioned so that when withdrawn or extended, the tape is spring-loaded so that it will retract into its case. The tape of such spring-balance tensioning means, which has been referred to by numeral 76, is provided with a link or the like 75 at its lower end, which link 75 may be mounted in notch 74 of lever member 73. It will thus be obvious that at all times the weight of the pan-like carriage member 50 will tend to extend the tape 76 against the spring tension exerted thereon, and thus lever member 73 will at all times be biased in a clockwise direction with the resultant effect as above referred to.

In order that when turntable 60 has been rotated 90°, as above referred to, for ripping, carriage member 50 may be moved downwardly to a desired point.

Board members 14 are recessed slightly, as shown at 87, so that the saw blade can be moved downwardly without interfering with the board members 14. There is provided in board members 14, either before they are assembled or by initial operation when the electric hand saw is mounted in the apparatus, a saw cut or slot 88 so that in subsequent sawing operations the saw blade may freely traverse the device without further cutting of the board members 14. Suitable stops 89 may be provided on a side guide member 40 to limit the traverse of carriage 50 at the top and bottom thereof. Suitable longitudinal indicia may be provided either on bottom frame member 12 or on ledge member 16 so that a board placed on the saw device may be accurately positioned for cutting.

It is deemed that the operation of the apparatus is, in view of the foregoing, quite clear to those skilled in the art, but, however, a short description thereof will be given as follows:

While the device hereof, as will be understood, can be built for the sawing of big, big boards, as, for example, boards as big as 8′ in width by 16′ in length, as are available, the usual such saw device will be for sawing the more generally used size of big board which is 4′ wide by 8′ in length. Due to the construction of the device, one of the size for sawing 4′ x 8′ board is readily portable and may be transported from job to job on a roof carrier mounted on an automobile. For preparing to use the device it is merely necessary to set it up against a wall or studs or the like, or, as mentioned, it may be supported by easel-like legs which may be attached so that no extraneous support is required. Since the device stands substantially vertical, it occupies relatively little space.

After the saw device has been set up with the electric hand saw in place on the turntable, the operation of sawing is very simple. A board is merely set on the ledge or edge support and against the bed of the device, and is moved until the point at which it is desired to sever the board is in line with the saw blade. It will be understood, of course, that the saw carriage is at the top of its traverse due to the bias exerted by the tensioning device referred to. When the board is properly positioned, then it is merely necessary, with the saw running, to grasp the saw handle and draw it downwardly, consequently severing the board along the desired line. It is, of course, understood, since the saw carriage rails or guides on which the carriage is traversed are at right angles to the supporting ledge on which the board is supported, that as a consequence the saw cut is accurate and square with respect to the edge of the board being sawed.

If instead of a cross cut severance it is desired to rip a board lengthwise, then the turntable on which the electric hand saw is mounted is rotated, the latch of course having been released, and when rotated 90°, the latch is then re-engaged with the consequence that the saw blade is positioned parallel to the board length. When the carriage, and consequently the saw blade, has been properly positioned, the carriage is then locked in place by tightening the thumb screw or wing nut which is provided for such purpose. The electric hand saw handle is then grasped and the saw and carriage are drawn down against the bias of the tensioning spring until the saw is at the line on which it is desired to rip the big board lengthwise. The board will then be placed on the supporting ledge and approached to the saw blade which, having been set into rotation, will, as the board is advanced and is continued to be advanced, rip the board lengthwise along the line in accordance with the positioning of the saw blades.

The particular improvements incorporated in the apparatus hereof are in connection with the turntable mounting, the latch therefor, and the mounting of the ledge on which rests the big board which is to be sawed. The turntable mounting, which also involves the latch mechanism, is such that the removal of the turntable together with the electric hand saw mounted thereon is extremely simple. If it is desired to change saws, or if servicing of the saw is required, or the like, it is only necessary that the latch handle be drawn upwardly against the tension, biasing such to closed position with the consequent withdrawal of the latch element whereupon, by a slight outward tilting of the turntable member, it, together with the saw mounted thereon, may be readily removed. Replacement is just as simple. In some instances it may be desired to have several different electric hand saws mounted on turntables so that one may be substituted for another. For example, in sawing wide boards of different types it may be desired, in the one case, to use an electric hand saw having mounted thereon a saw with fine teeth, whereas for a different board it may be desired that the saw blade be one with coarse teeth. In such a case it is a very simple matter to remove one turntable and attached saw and substitute another.

The latch device serves several functions. As just above referred to, it not only retains the turntable in place but in cooperation with the latch posts the turntable may be latched securely in either of two positions, one of which is displaced at right angles with respect to the other. In connection with the latch device, it is also to be noted that by its construction the attachment of the carriage biasing element thereto serves two functions, one that of biasing the saw carriage to the upper limit of its traverse, and the other being that of tensioning the turntable latch for engagement with a cooperating latch post.

The bottom ledge or rest construction is such that the effect of expansion or contraction or of warping of the bottom frame member 12 can have little or no effect on the alignment of the board supporting ledge or rest. Or, in case that any such effect may be sufficient to cause a degree of variation in alignment of the ledge or rest, adjustment to offset any such misalignment may be readily accomplished by adjustment of the adjusting screws provided for such purpose.

The invention hereof and the manner of use thereof having been above described in detail, I claim:

1. In a wide board saw as described and which comprises in combination, a supporting frame comprising in part supporting legs, a board supporting bed secured to the frame, the bed at a longitudinal edge thereof having a raised supporting shoulder projecting above the surface of the bed proper, cross slide rail members comprising spaced longitudinal members and transverse members connecting the longitudinal members adjacent their ends, the cross slide mounted over the bed, extending transversely thereof and spaced therefrom, and an electric power hand saw carriage slideably mounted on said cross slide rails; the improvement in said carriage structure comprising a substantially flat base portion surrounding and defining a circular opening therethrough, a turntable member mounted on said base portion and supported on an annular portion of such base portion immediately surrounding the opening therethrough, means retaining the turntable member on the bed portion of the carriage and comprising substantially Z form clip members secured to the base portion of the carriage and having portions thereof overhanging the edge of the turntable member, the clips being spaced circumferentially approximately 90°, and a third retaining member positioned diametrically opposite the mid-point between the previously said clips and comprising a biased retractable member mounted to the carriage structure and extending over the edge of the turntable.

2. In the apparatus as defined in claim 1, a stop member mounted to and projecting above the top surface of the turntable adjacent the edge thereof and a notch-like recess formed in the forward edge of the third retaining member whereby by engagement of the notch-like recess of the third retaining member with the projecting stop member the turntable is secured against turning.

3. In the apparatus as defined in claim 1, two stop members, spaced 90°, mounted to and projecting above the top surface of the turntable member adjacent the edge thereof, and a notch-like recess formed in the forward edge of the third retaining member whereby by selective engagement of the notch-like recess of the third retaining member with a said stop member the turntable member may be latched and secured against turning in either of two positions, one angularly displaced 90° from the other.

4. A big board saw apparatus as disclosed and comprising top and bottom frame members, downwardly diverging leg members mounted to the frame members and strip members comprising a bed mounted to the diverging leg members, the structure adapted for operation in substantially vertical position, spaced parallel guide rails mounted to the frame members over the bed, extending transversely thereof, and spaced therefrom and parallel thereto, a carriage slideably mounted to the guide rails and a turntable member mounted to the carriage, spring tensioning means mounted to the top frame member and to the carriage and biasing the carriage toward the top frame member, the connection of the spring tensioning means to the carriage made through an interposed structure, said interposed structure comprising a lever pivoted intermediate its ends to the carriage, the portion of the lever to one side of the pivot having a notch formed therein and receiving the tensioning means and the portion of the lever to the other side of the pivot comprising in part a projecting latch member projecting over the edge of the turntable mounted to the carriage whereby the last said portion of the lever comprising a projecting latch member retains the turntable to the carriage.

5. A big board saw apparatus as disclosed and comprising top and bottom frame members, downwardly diverging leg members mounted to the frame members, and strip members comprising a bed mounted to the diverging leg members, the structure adapted for operation in substantially vertical position, spaced parallel guide rails mounted over the bed, extending transversely thereof, spaced therefrom and parallel thereto, a carriage slideably mounted to the guide rails and a turntable member mounted to the carriage, spring tensioning means mounted to the carriage and biasing the carriage toward the top frame member, the connection of the spring tensioning means to the carriage made through an interposed structure, the interposed structure comprising a latch lever pivoted intermediate its ends to the carriage, the spring tensioning means connected adjacent the outer end of that portion of the lever on one side of its pivotal mounting and the portion of the lever to the other side of its pivotal mounting comprising in part a projecting latch member projecting over the edge of the turntable mounted to the carriage whereby the last said portion of the lever, comprising a projecting latch member, retains the turntable to the carriage, an operating lever pivotally mounted intermediate its ends to the latch lever, the pivot point thereof relative the pivot point of the latch lever being beyond he projecting latch member, the operating lever portion to one side of its pivotal mounting serving as an operating handle and that portion to the other side of its pivot point extending beyond the pivotal mounting of the latch lever and substantially bearing on the structure of the carriage whereby, upon manipulation of the operating handle portion of the operating lever, the opposite end portion thereof acting as a fulcrum causes the latch lever to tilt with consequent withdrawal of the projecting latch member from latching position to permit ready removal of the turntable.

6. In a big board saw apparatus comprising a bed portion, at the bottom edge thereof a board supporting ledge member, spaced cross-slide rail members extending across the bed portion at right angles to the supporting ledge portion, a carriage member and means slidably mounting the carriage to the cross-slide rail members and a rotatable saw carrying member mounted to the carriage member and relatively rotatable with respect thereto; the improvement comprising an adjustable board support associated with and mounted to said board supporting ledge member and comprising an inverted substantially L-shaped member, strip form members secured to the stem portion of the substantially L-shaped member, the strip form member extending across a vertical face of the board supporting member, means releasably mounting the strip form member to the board supporting ledge member and adjustable means mounted to the board supporting ledge member and extending into contact with the under face of the base portion of the inverted L-shaped member and adjustable to vary the position of the inverted L-shaped member with respect to the board supporting member.

References Cited in the file of this patent

UNITED STATES PATENTS

| | | |
|---|---|---|
| 174,503 | Elliott et al. | Mar. 7, 1876 |
| 551,934 | Randall | Dec. 24, 1895 |
| 2,495,250 | Gilly | Jan. 24, 1950 |
| 2,572,091 | Ashley et al. | Oct. 23, 1951 |
| 2,741,277 | Leger | Apr. 10, 1956 |
| 2,833,320 | Bennett | May 6, 1958 |

FOREIGN PATENTS

| | | |
|---|---|---|
| 114,349 | Australia | Dec. 4, 1941 |